(12) United States Patent
Aoyagi

(10) Patent No.: US 10,797,563 B2
(45) Date of Patent: Oct. 6, 2020

(54) POWER GENERATING DEVICE

(71) Applicant: ADAMANT CO., LTD., Tokyo (JP)

(72) Inventor: Tomohide Aoyagi, Tokyo (JP)

(73) Assignee: ADAMANT NAMIKI PRECISION JEWEL CO., LTD., Tokyo (JP)

( * ) Notice: Subject to any disclaimer, the term of this patent is extended or adjusted under 35 U.S.C. 154(b) by 605 days.

(21) Appl. No.: 15/324,516

(22) PCT Filed: Jul. 9, 2015

(86) PCT No.: PCT/JP2015/003464
§ 371 (c)(1),
(2) Date: Jan. 6, 2017

(87) PCT Pub. No.: WO2016/009623
PCT Pub. Date: Jan. 21, 2016

(65) Prior Publication Data
US 2017/0201159 A1     Jul. 13, 2017

(30) Foreign Application Priority Data

Jul. 15, 2014 (JP) .................... 2014-145077

(51) Int. Cl.
*H02K 7/18* (2006.01)
*H02K 7/06* (2006.01)
(Continued)

(52) U.S. Cl.
CPC ............ *H02K 7/1853* (2013.01); *H02K 5/04* (2013.01); *H02K 7/06* (2013.01); *H02K 11/0094* (2013.01); *H02K 11/30* (2016.01); *H02K 2203/03* (2013.01)

(58) Field of Classification Search
CPC .... H02K 7/1853; H02K 7/06; H02K 11/0094; H02K 11/30; H02K 2203/03; H02K 5/04
See application file for complete search history.

(56) References Cited

U.S. PATENT DOCUMENTS

| 7,525,214 B2 | 4/2009 | Atilano Medina et al. |
| 2011/0260469 A1 | 10/2011 | Baarman et al. |

(Continued)

FOREIGN PATENT DOCUMENTS

| CN | 1773815 A | 5/2006 |
| CN | 201549924 U | 8/2010 |

(Continued)

OTHER PUBLICATIONS

PCT/ISA/210, "International Search Report for International Application No. PCT/JP2015/003464" dated Oct. 6, 2015.

(Continued)

*Primary Examiner* — Jue Zhang
(74) *Attorney, Agent, or Firm* — Manabu Kanesaka

(57) ABSTRACT

Provided is a power generating device which, while having a basic structure of using a rack and a pinion, increases power generating efficiency and has fewer components, has improved durability due to a simplified structure, and can easily be made in smaller sizes. Configuring a guide mechanism using outer walls of a case of a power generating unit as guides and combining the same with rails provided on inner walls of a case of the power generating device distributes unnecessary stress on the power generating unit over the inner walls of the case to obtain effects of achieving an overall small size, reduction in the number of components, and improved durability.

7 Claims, 4 Drawing Sheets

(51) Int. Cl.
  *H02K 11/30*  (2016.01)
  *H02K 5/04*  (2006.01)
  *H02K 11/00*  (2016.01)

(56) References Cited

U.S. PATENT DOCUMENTS

| | | | | |
|---|---|---|---|---|
| 2015/0216083 A1* | 7/2015 | Kanazawa | ............. | H02K 7/116 |
| | | | | 310/52 |
| 2016/0164389 A1* | 6/2016 | Jang | ............. | H02K 35/02 |
| | | | | 310/20 |

FOREIGN PATENT DOCUMENTS

| | | |
|---|---|---|
| CN | 103768764 A | 5/2014 |
| CN | 203608023 U | 5/2014 |
| DE | 2431402 A1 | 1/1976 |
| DE | 102009039214 A1 | 3/2011 |
| JP | H04-67877 A | 3/1992 |
| JP | H06-70506 A | 3/1994 |
| JP | 2003-333795 A | 11/2003 |
| JP | 2004-260896 A | 9/2004 |
| JP | 2008-133799 A | 6/2008 |
| JP | 2009-029360 A | 2/2009 |
| WO | 2007/146542 A2 | 12/2007 |

OTHER PUBLICATIONS

PCT/ISA/237, "Written Opinion of the International Searching Authority for International Application No. PCT/JP2015/003464," dated Oct. 6, 2015.
PCT/IB/373, "International Preliminary Report on Patentability for International Application No. PCT/JP2015/003464," dated Jan. 17, 2017.
Europe Patent Office, "Search Report for European Patent Application No. 15822158.0," dated Feb. 2, 2018.
China Patent Office, "Office Action for Chinese Patent Application No. 201580033380.1," dated Jul. 4, 2018.
China Patent Office, "Office Action for Chinese Patent Application No. 201580033380.1," dated May 8, 2019.

\* cited by examiner

POWER GENERATING DEVICE

RELATED APPLICATIONS

The present application is National Phase of International Application No. PCT/JP2015/003464 filed Jul. 9, 2015, and claims priority from Japanese Application No. 2014-145077, filed Jul. 15, 2014, the disclosure of which is hereby incorporated by reference herein in its entirety.

TECHNICAL FIELD

The present invention relates to a power generating device that generates induced electromotive force using stress and vibration produced in vehicle steering wheels, fittings such as doors, and other outdoor equipment or mobile devices to supply power to electronic devices including various types of sensors.

BACKGROUND ART

A structure for generating power by combining a motor assembled with a pinion gear and a rack gear is currently used as a power generating device that can be incorporated into, for example, small mobile electronic devices or fittings. Typical structures of such power generating devices have been filed and published under JP 2004-260896 A (hereinafter referred to as "Patent Literature 1") and JP 2008-133799A (hereinafter referred to as "Patent Literature 2").

Patent Literature 1 is characterized by a structure in which a longitudinal member that functions as a rack is combined with a rotational member that functions as a case side input shaft of a power generating unit, the structure being able to draw power from relative linear movement relating to the rotational member.

Patent Literature 2 is characterized by the continuous generation of power using the structure described in Patent Literature 1 and involves a structure in which a rack is rotated by gravity and a drive source that uses power generated by itself to reciprocate a pinion on the rack in an up-down direction. Thus, the structure of Patent Literature 2 is capable of continuously generating power without the influence of installation conditions.

CITATION LIST

Patent Literature

Patent Literature 1: JP 2004-260896 A
Patent Literature 2: JP 2008-133799 A

SUMMARY OF INVENTION

Technical Problem

While having the above effects, Patent Literatures 1 and 2 have the problem that, by construction, a shaft to which a pinion is attached directly receives the added weight of the power generating unit. Thus, to generate power by moving the power generating unit by gravity or inertia, a separate slide guide is required to drive the pinion and the rack to slide without the pinion and the rack slanting. For this slide guide, in Patent Literature 1, regulation means 8 should be provided and in Patent Literature 2, an oblong concave guard frame 2 should be provided. Additionally, because of the need to provide the slide guide, the structures of these conventional power generating devices are inevitably complex due to an increase in the number of components. The complex structure also makes it difficult to achieve an overall small size and to ensure durability, and thus it is necessary to protect the whole power generating device from strong external forces such as impacts and vibrations.

To solve the above problem, it is an object of the invention described in the present application to provide a power generating device which, while having a basic structure of using a rack and a pinion, increases power generating efficiency and has fewer components, has improved durability due to a simplified structure, and can easily be made in smaller sizes.

Solution to Problem

For the above object, a structure described in a first aspect of the present invention has the technical features of incorporating a case itself of a power generating unit into a guide mechanism inside a power generating device main body and of forming an input shaft of a motor that is provided inside the power generating device separately from a case side input shaft of the power generating unit.

The technical feature of a structure described in a second aspect of the present invention lies in that a component part of a housing serves as a weight in the structure described in the first aspect.

The technical feature of a structure described in a third aspect of the present invention lies in that a flexible printed circuit board is used to supply power from the motor that is provided inside the case in the structure described in the first aspect.

Advantageous Effects of Invention

Using the above structure enables the power generating device described in the first aspect of the present invention to provide the power generating device which increases power generating efficiency and has fewer components, has improved durability due to a simplified structure, and can easily be made in smaller sizes.

More specifically, since the guide mechanism of the power generating device is composed of the case of the power generating unit and a guide case of the power generating device main body, external force received by the power generating device and the power generating unit with a simplified structure can be distributed over the entire case of the power generating unit. Additionally, the structure in which the case receives the external force prevents the external force from concentrating on the input shaft of the case and a rack that meshes with the input shaft and enables the number of components to be reduced while improving durability as the power generating device. Furthermore, providing the case side input shaft of the power generating unit separately from the motor input shaft enables the input shaft of the motor to be protected from deforming due to the external force and also enables the case side input shaft to be protected from the external force by the case of the power generating unit.

In the structure described in the present invention, the power generating unit itself moves to rotate the case side input shaft, which is meshed with the rack, of the power generating unit and transmits the rotation of the input shaft with power transmission means such as a gear to the input shaft of the power generating motor that is provided inside the unit to rotate the same. Thus, in the present invention, by changing a transmission ratio of the power transmission means including a gear ratio, load applied to the case side input shaft and the power transmission means, the number of revolutions of the motor, and the like can be adjusted. Consequently, a configuration which accommodates the external force that is generated in an environment in which a power generating mechanism inside the power generating device is used improves the overall power generating efficiency. Additionally, a structure in which the power generating unit moves enables most of the weight of components that configure the power generating device in the structure described in the present invention to be used as inertial force during power generation.

Further, using the invention described in the second aspect of the present invention in which the component part of the housing of the power generating unit according to the first aspect serves as a weight increases the inertial force during power generation and maintains movement rate of the power generating unit due to the external force constant. Thus, in this aspect, fluctuations in power generation to be supplied by the power generating device can be reduced and power can be supplied stably.

Furthermore, using the invention described in the third aspect of the present invention increases reliability of the power generating unit according to the first aspect and enables power to be supplied without causing an open circuit even during high-speed movement of the power generating unit. More specifically, matching a deformation direction of the flexible printed circuit board that is connected to the motor inside the power generating unit with a movement direction of the power generating unit prevents open circuits due to repeated stress during the high-speed movement. Thus, this aspect can be operated with a large amount of power generation without slowing the movement rate of the power generating unit.

As discussed above, the structure described in the claims of the present application is capable of providing the power generating device which, while having a basic structure of using a rack and a pinion, increases power generating efficiency and has fewer components, has improved durability due to a simplified structure, and can easily be made in smaller sizes.

DESCRIPTION OF EMBODIMENTS

A best mode of the present invention is described below with reference to FIGS. 1, 2, and 3. With respect to symbols and component numbers in the figures, common symbols or numbers are given to elements that function as like components, and for identical components, lead lines and numbers have been partly omitted.

Figure 1:
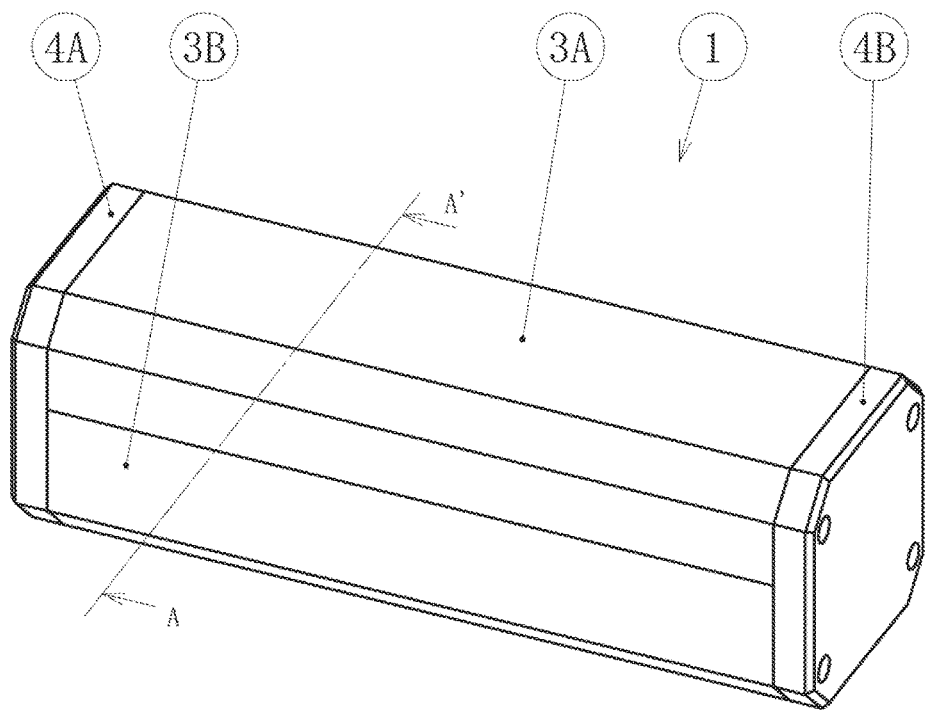
FIG. 1 is an overall perspective view of a power generating device used in an embodiment of the present invention.
Figure 2:
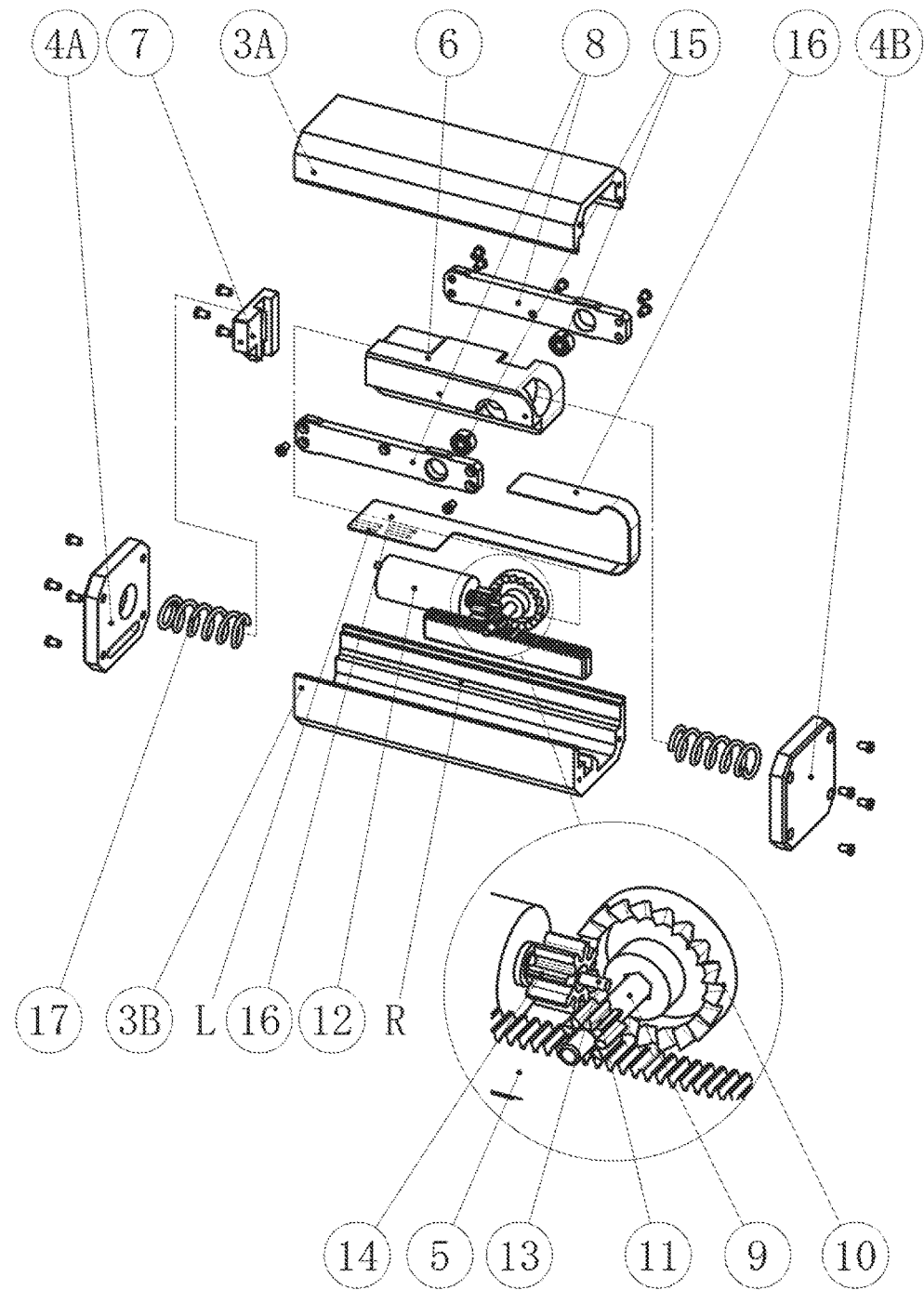
FIG. 2 is an exploded perspective view of the power generating device shown in FIG. 1.
Figure 3:
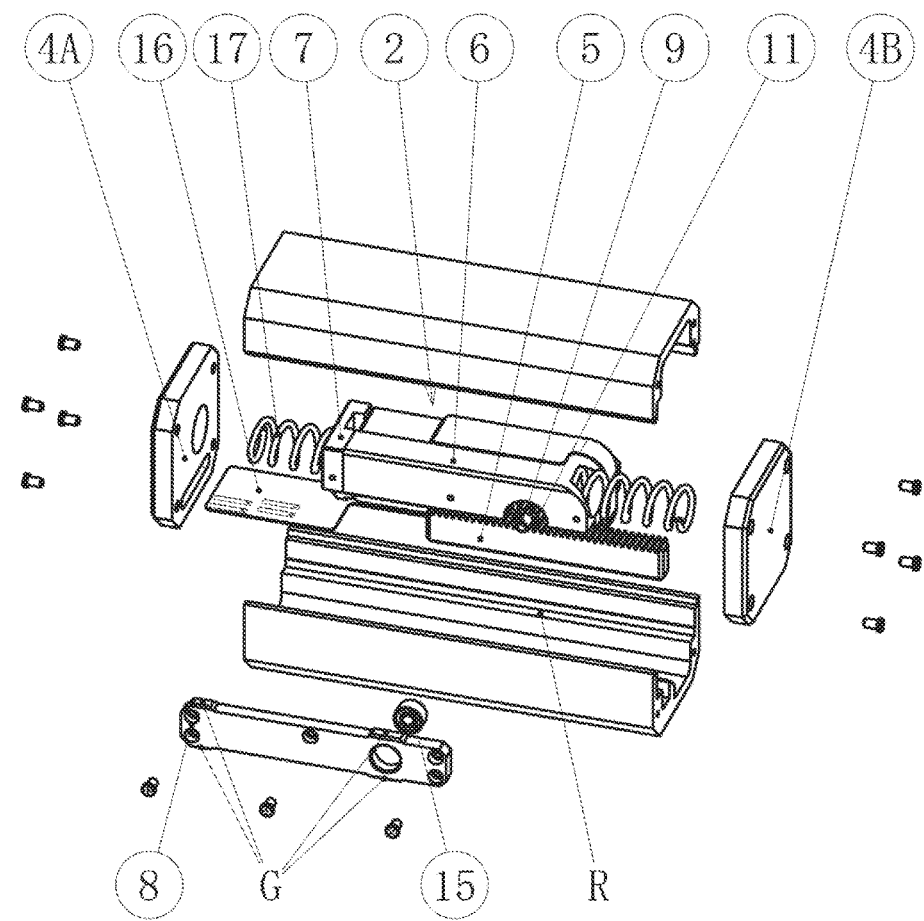
FIG. 3 is a perspective view of a power generating unit of the power generating device shown in FIG. 1.
Figure 4:
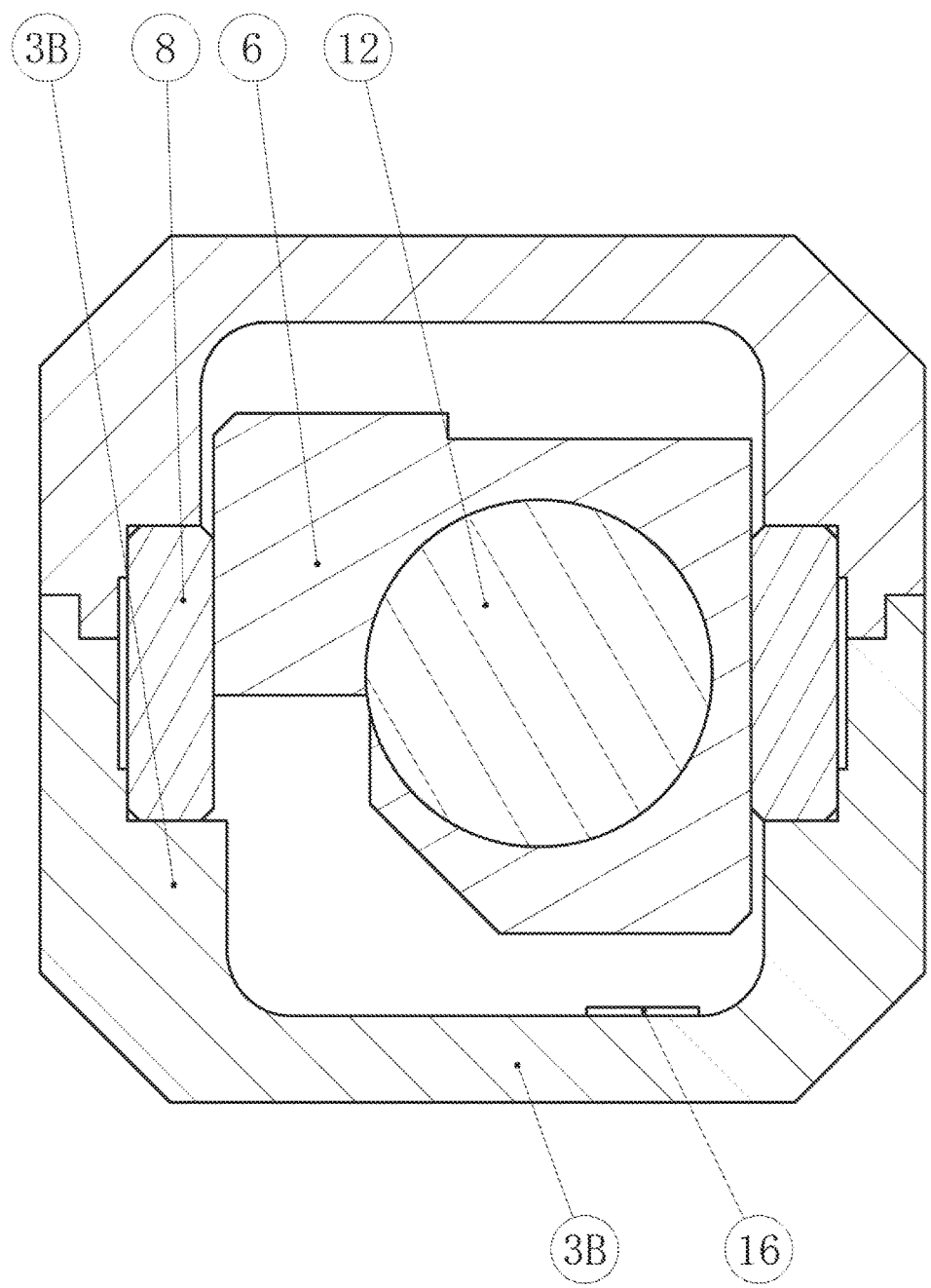
FIG. 4 is a side cross-sectional view of the power generating device shown in FIG. 1.

FIG. 1 shows an overall perspective view of a power generating device used in an embodiment of the present invention, FIG. 2 shows an exploded perspective view thereof, FIG. 3 shows a perspective view of a power generating unit mounted in FIG. 1, and FIG. 4 shows a side cross-sectional view taken along the line A-A' in FIG. 1, respectively. Depiction, for example, of a charger electrically connected to the power generating device and depiction of an interior of the power generating motor in the side cross-sectional view of FIG. 4 have been omitted in the figures.

As shown in FIG. 1, a power generating device 1 described in the present embodiment has a fixed structure in which an upper guide case 3A and a lower guide case 3B are sandwiched by two guide case covers 4A, 4B. The upper guide case 3A and the lower guide case 3B are positioned by meshing with each other. This structure facilitates arrangement of components in a guide mechanism described below for the power generating unit described in the present embodiment.

As shown in FIGS. 2 and 3, in the power generating device 1 of the present embodiment, a case of a power generating unit 2 is configured by covering, with covers 8, both side surfaces of a housing 6 that accommodates and fixes, for example, a power generating motor 12 therein, and fixing a bottom surface of the power generating motor 12 that is provided inside the housing 6 with a housing bottom 7. Inside the case, there is used a power generating mechanism having the housing 6 that includes the power generating motor 12 for which a motor side pinon gear 14 is provided on a motor input shaft 13, a crown gear 10 that transmits power to the pinon gear 14, and a case side input shaft 9, to which the crown gear 10 is fixed, of the power generating unit 2, and the case side input shaft 9 is rotatably supported by bearings 15 that are provided on the covers 8. When being incorporated, a pinion gear 11 attached to the case side input shaft 9 is arranged meshed with a rack 5 that is separately secured to the lower guide case 3B, and thus the pinion gear 11 is capable of rotating the input shaft 9 along with movement of the power generating unit 2 to drive the power generating motor 12. In the present embodiment, the crown gear 10 is arranged by cutting out the housing 6. Consequently, the diameter of the crown gear 10 can be maximized within a limited mounting space and the power generating motor 12 can be driven at high rotational speeds during transmissions from the crown gear 10 to the motor input shaft 13. Between each end of the power generating unit 2 and each of the case covers 4A, 4B, a spring 17 is extendably supported. Thus, when the power generating device 1 is driven, the power generating unit 2 can be moved stably.

In addition to the above basic structure, the present embodiment includes a guide mechanism in which the case of the power generating unit 2 is fit into rails R provided on inner walls of the upper guide case 3A and the lower guide case 3B. More specifically, as shown in FIGS. 3 and 4, a structure is used in which guides G of the covers 8 that configure the case of the power generating unit 2 are fit over the rails R provided on the upper guide case 3A and the lower guide case 3B. Consequently, the power generating device 1 of the present embodiment increases power generating efficiency and has fewer components, has improved durability due to a simplified structure, and can easily be made in smaller sizes.

That is, according to the guide mechanism described above, the present embodiment is capable of distributing stress other than the stress in the movement direction that the power generating unit 2 receives during power generation over surfaces of contact between the guides G provided in the case and each of the guide cases 3A, 3B. Thus, the power generating device 1 of the present embodiment prevents concentration of the stress on the case side input shaft 9 of the power generating unit 2 and the rack 5, has improved durability as the power generating device while having fewer components, and can easily be made in smaller sizes. Additionally, forming the motor input shaft 13 and the case side input shaft 9 as separate bodies and arranging them orthogonal to each other protects the motor input shaft 13 from warping that occurs during driving and improves durability including that of the power generating mechanism inside the case. Although in the present embodiment the stress is absorbed by the covers 8 and the housing side surfaces to which the covers 8 are attached, from a similar technical standpoint, surfaces of the case other than in the movement direction of the power generating unit 2 may be provided with a similar guide mechanism by making the inner walls of the guide cases 3A, 3B being brought into contact with the surfaces internally to improve durability.

In the present embodiment, the power generating unit 2 itself moves along the guide mechanism and rotates the case side input shaft 9 that is meshed with the rack 5 to transmit power to the crown gear 10 fixed to the input shaft 9 and the associated motor input shaft 13. Thus, in the structure described in the present embodiment, most of the weight of the components that make up the power generating device 1 can be used as inertial force during power generation. Additionally, the present embodiment can be optimized to accommodate the external force that is generated in the environment in which the power generating mechanism in the power generating device is used by changing the gear ratio between the rack 5, the crown gear 10 and the case, and the motor input shaft 13, and the spring 17 to improve the overall power generating efficiency. In the present embodiment, using high specific gravity materials for component parts of the housing including the housing bottom 7 causes the component to also serve as a weight. This configuration enables the present embodiment to obtain the effects of increasing the inertial force working on the power generating unit 2 when the power generating unit 2 is moving and of stabilizing the movement rate of the power generating unit 2.

As shown in FIGS. 2 and 3, in the present embodiment, a flexible printed circuit board 16 is used to transmit power from the power generating motor 12 in the power generating unit outside of the power generating device. The flexible printed circuit board 16 is curved along a curved surface of the housing that forms a part of the case and the movement direction of the power generating unit, and then drawn outside of the power generating device through an opening of the guide case cover 4A. Thus, the power generating device 1 described in the present embodiment can prevent open circuits due to repeated stress during the high-speed movement of the power generating unit 2 and can be driven with high reliability. Since the power generating motor 12 of the present embodiment is not required in its application to rotate independently, the power generating motor 12 has a 2-phase 2-pole construction and is capable of generating power with a higher power generating efficiency compared to a 3-phase 2-pole motor that is generally used.

From the foregoing, using the power generating device described in the present embodiment provides the power generating device which, while having a basic structure of using a rack and a pinion, increases power generating efficiency and has fewer components, has improved durability due to a simplified structure, and can easily be made in smaller sizes.

REFERENCE SIGNS LIST

1 Power generating device
2 Power generating unit
3A Upper guide case
3B Lower guide case
4A, 4B Guide case covers
5 Rack
6 Housing
7 Housing bottom
8 Covers
9 Case side input shaft
10 Crown gear
11 Case side pinion gear
12 Power generating motor
13 Motor input shaft
14 Motor side pinion gear
15 Bearings
16 Flexible printed circuit board
17 Spring
G Guides
R Rails
L Transmission land

The invention claimed is:

1. A power generating device comprising:
a unit case,
a power generating motor fixed inside the unit case and having a motor input shaft and a gear attached to the motor input shaft,
a case side input shaft rotationally attached to the unit case and connected to the motor input shaft through the gear for transmitting rotational force of the case side input shaft to the gear,
a crown gear connected to the case side input shaft and meshing with the gear, the crown gear being arranged by cutting out the unit case,
covers attached to two side surfaces of the unit case and having bearings that rotatably support the case side input shaft projecting from the unit case, and
a guide case slidably retaining the unit case therein, and having a rack fixed to the guide case and meshing with the case side input shaft so that when the unit case slides inside the guide case, the power generating motor rotates and generates electricity.

2. The power generating device according to claim 1, wherein the unit case is made of a specific gravity material that serves as a weight.

3. The power generating device according to claim 1, further comprising a flexible printed circuit board for supplying power from the power generating motor.

4. The power generating device according to claim 1, wherein the guide case further includes rails, and the covers further include guides disposed on the rails to slide thereon.

5. The power generating device according to claim 4, wherein the case side input shaft includes a pinion gear meshing with the rack, and the crown gear meshing with the gear of the motor input shaft so that rotation of the pinion gear is transmitted to the motor input shaft to generate electricity.

6. The power generating device according to claim 4, wherein the bearings rotationally supporting the case side input shaft are attached to the covers so that the covers are disposed on two sides of the unit case and slidably support the unit case through the rails and the guides while the pinion gear meshes the rack.

7. The power generating device according to claim 1, wherein the power generating motor is configured to generate electricity when the motor input shaft is rotated.

* * * * *